(12) United States Patent
Michelsen

(10) Patent No.: US 7,844,545 B2
(45) Date of Patent: Nov. 30, 2010

(54) SYSTEMS AND METHODS FOR VALIDATING IDENTIFICATIONS IN FINANCIAL TRANSACTIONS

(75) Inventor: Michael J. Michelsen, Arvada, CO (US)

(73) Assignee: The Western Union Company, Englewood, CO (US)

( * ) Notice: Subject to any disclaimer, the term of this patent is extended or adjusted under 35 U.S.C. 154(b) by 2616 days.

(21) Appl. No.: 10/424,562

(22) Filed: Apr. 25, 2003

(65) Prior Publication Data

US 2004/0215557 A1    Oct. 28, 2004

(51) Int. Cl.
*G06Q 40/00* (2006.01)
(52) U.S. Cl. ...................................................... 705/39
(58) Field of Classification Search ............. 705/35–44, 705/64–67, 72–79; 902/1–4
See application file for complete search history.

(56) References Cited

U.S. PATENT DOCUMENTS

| | | | |
|---|---|---|---|
| 5,679,938 A * | 10/1997 | Templeton et al. .......... 235/379 |
| 6,012,048 A | 1/2000 | Gustin et al. |
| 6,029,150 A * | 2/2000 | Kravitz .......................... 705/39 |
| 6,149,055 A | 11/2000 | Gatto |
| 6,330,546 B1 * | 12/2001 | Gopinathan et al. ........... 705/35 |
| 8,330,546 | 12/2001 | Gopinathan et al. |
| 6,612,488 B2 * | 9/2003 | Suzuki ........................ 235/380 |
| 2002/0020742 A1 * | 2/2002 | Streicher et al. ............. 235/381 |
| 2003/0056113 A1 * | 3/2003 | Korosec ..................... 713/200 |
| 2003/0139994 A1 * | 7/2003 | Jones ......................... 705/36 |

\* cited by examiner

*Primary Examiner*—Olabode Akintola
(74) *Attorney, Agent, or Firm*—Townsend and Townsend and Crew LLP

(57) ABSTRACT

A method of confirming the validity of an identification presented by an individual in a financial transaction includes receiving transaction information at a transaction device that is usable to perform the financial transaction. The method also includes determining the need for identification information based at least in part on the transaction information. The method further includes receiving identification information at the transaction device. The identification information is obtained from an identification of the individual and the identification information has a format. The method also includes transmitting the identification information to a host computer system. At the host computer system and based at least in part on the format of the identification information, the validity of the identification from which the identification information was obtained is accessed.

20 Claims, 2 Drawing Sheets

SYSTEMS AND METHODS FOR VALIDATING IDENTIFICATIONS IN FINANCIAL TRANSACTIONS

CROSS-REFERENCES TO RELATED APPLICATIONS

This application is related to co-pending, commonly assigned and concurrently filed Provisional U.S. Patent Application No. 60/465,967, entitled "SYSTEMS AND METHODS FOR PRODUCING SUSPICIOUS ACTIVITY REPORTS IN FINANCIAL TRANSACTIONS," and to co-pending, commonly assigned, and concurrently filed U.S. patent application Ser. No. 10/424,558, entitled "SYSTEMS AND METHODS FOR VERIFYING IDENTITIES IN TRANSACTIONS," the entire disclosures of which are incorporated herein by reference for all purposes.

BACKGROUND OF THE INVENTION

The present invention relates generally to money transfer transactions. More specifically, the present invention relates to confirming the validity of identifications presented by persons involved in money transfers.

Many people use the services of money transfer service providers to send funds to other people or purchase negotiable instruments such as money orders and travelers checks. Electronic communication and financial services networks now allow such transactions to have a nearly global reach. Unfortunately, some people use the services of money transfer service providers to transfer money for illegal or unethical purposes. Regulations attempt to thwart this type of activity by requiring positive identification of individuals involved in certain transactions, such as, for example, transactions above an established value threshold. Positive identification is generally established through the use of an identification card (e.g., a driver's license) of some sort. Because of the myriad forms of identification cards in common use and the potential that some individuals may present false identification in an attempt to avoid providing positive identification, systems and methods are needed for confirming the validity of identifications.

BRIEF SUMMARY OF THE INVENTION

Embodiments of the present invention thus provide a method of confirming the validity of an identification presented by an individual in a financial transaction. The method includes receiving transaction information at a transaction device that is usable to perform the financial transaction. The method also includes determining the need for identification information based at least in part on the transaction information. The method further includes receiving identification information at the transaction device. The identification information is obtained from an identification of the individual and the identification information has a format. The method also includes transmitting the identification information to a host computer system. At the host computer system and based at least in part on the format of the identification information, the validity of the identification from which the identification information was obtained is accessed. In some embodiments, the method may include requesting from an identity verification system verification information relating to the identification information and using the verification information to further access the validity of the identification from which the identity information was obtained. The identity verification system may include a selection from a group consisting of driver's license database, social security information database, image database, government identification database, identification verification company database, previously-used "valid" identification database, and credit reporting database. In still other embodiments the method may include transmitting the transaction information to the host computer system. The identification information may include a selection from a group consisting of driver's license number, passport number, state identification number, alien identification number, government identification number, social security number, fingerprint, retinal scan, facial scan, and DNA. Accessing the validity of the identification may include calculating a risk score based at least in part on the identification information. The method also may include deciding to prepare a suspicious activity report relating to the transaction based in part on the score. Accessing the validity of the identification may include determining the validity of the identification based at least in part on the location. The identification may relate to a customer initiating the transaction or to an attendant operating the transaction device.

In another embodiment of the invention, a method of confirming the validity of an identification presented by an individual in a financial transaction includes receiving identification information at a transaction device. The identification information has a certain format and relates to the individual in the financial transaction. The identification information is obtained from the identification and the format relates to an identification type. The method also includes transmitting the identification information to a host computer system where the format of the identification is used to determine the identification type. The method also includes consulting an identification verification system relating to the identification type and receiving verification information from the identification verification system relating to the identification information the method also includes determining the validity of the identification based at least in part on the verification information.

In yet another embodiment of the present invention, a system for confirming the validity of an identification presented by an individual in a financial transaction includes a transaction device configured to receive identification information from the identification and transmit the identification information to a host computer system. The system also includes a host computer system programmed to receive the identification information. The host computer system is also programmed to compare a format of the identification information to formats of known identification types and select an identification type that relates to the identification based at least in part on the comparison. The host computer system is also programmed to use the identification type to assess the validity of the identification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1:
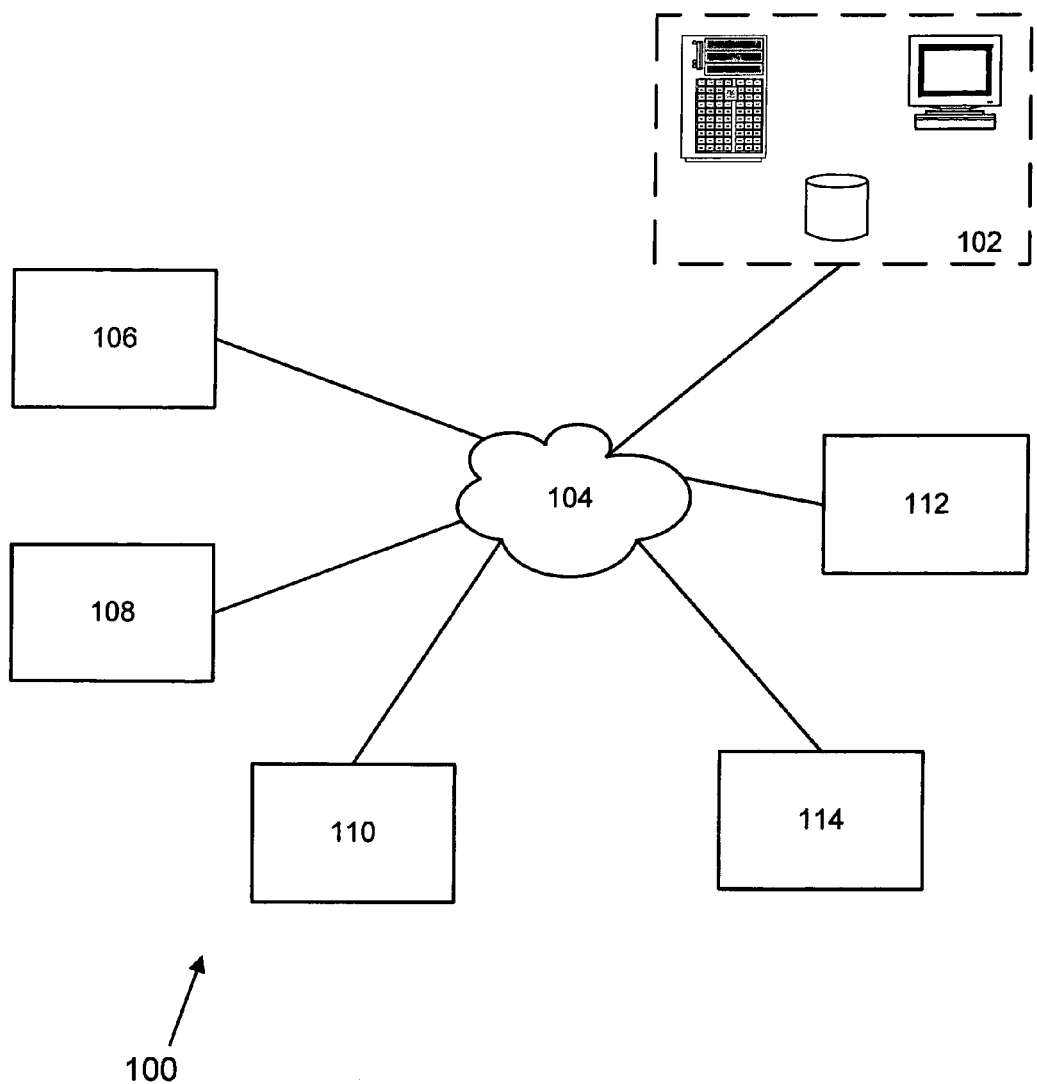
FIG. 1 illustrates a system for verifying identifications according to embodiments of the present invention.

According to the present invention, money transfer service providers employ systems and methods to confirm identifications (hereinafter "IDs") presented by individuals involved in money transfer transactions. Herein, "provider" or "service provider" will refer to a money transfer service provider. For example, "provider" may refer to an entity such as Western Union of Englewood, Colo., whose money transfer service is well known. Additionally, "associate" will refer to entities that a money transfer service provider may enlist to accomplish the service. For example, third parties, such as merchants, financial institutions, and the like may be "associates." Herein "attendant" will refer to someone with whom a customer interacts in the transaction process. For example, an attendant may be an employee of a provider or associate. An attendant typically operates a transaction processing device, entering information received from the customer and/or related to a transaction. Further, although the phrase "money transfer" will be used herein to refer to the type of service provided, that phrase will be understood to mean any financial transaction involving "value," which may include money, credits, customer loyalty points, other units of measure, and the like.

Also, herein "ID" will refer to anything presented to establish positive identification. Exemplary IDs include ID cards, such as driver's licenses, military cards, employee cards, and the like, passports, biometric features, such as finger prints, retinal images, facial scans, DNA, and the like, holographic images, and the like. IDs may include encoded information that may be read or scanned at a transaction device. Identification information may be encoded in a magnetic stripe, a radio frequency generator, a one-dimensional or multi-dimensional bar code, or the like. IDs may be government issued, privately issued, or integrally associated with an individual's anatomy.

Although the present invention will be described primarily in the context of money transfers, other types of transactions also may benefit from the teachings herein. Thus, transactions to which the present invention applies may include money order purchases and/or redemptions, traveler's check purchases and/or redemptions, sending money to a recipient, receiving money from a sender, and the like.

The process of "wiring" money is well known. Briefly, a sender presents himself to a service provider or associate and provides value, usually cash, to an attendant. Some service providers now even allow senders to transfer money by logging on to a web site and initiating money transfers using credit cards or other accounts. In either case, information is entered into a record that is received at a host computer system. The record includes information that identifies the sender, the recipient, and the amount of money being transferred, among other things. The recipient then presents himself to a receive site of a provider or associate to obtain the money or other value. An attendant at the receive site verifies the identity of the receiver and gives the receiver the value.

At the sending end of the transaction, the transaction information may be collected in any number of ways. In some cases, the information is collected by a point-of-sale device specifically designed for money transfer transactions. The device may be operated by an attendant employed by the provider or an associate. In another case, the information may be collected using a computing device running application software specifically designed for money transfer transactions. In yet another case, the information may be collected by phone when an attendant contacts a customer service representative (CSR) of the provider. The attendant is able to verify the sender's information and collect funds while the CSR enters the information into a transaction record. It also may be the case that the transaction is initiated by an associate who then must contact a CSR because the transaction exceeds certain thresholds. In yet another example, the customer provides some information to a CSR at a remote location while also entering some information into a transaction processing device by, for example, "swiping" a card through a reader on the device. Other examples are possible.

For a number of reasons, identity verification is a significant aspect to the money transfer process. For example, in one instance, it is important to verify the identity of the sender. In an attempt to thwart illegal or unethical money transfers, it is helpful to confirm the identity of a sender, especially on transfers over certain value thresholds. Transfers over the thresholds may require the provider to obtain additional information from the sender. In some cases, the information may be compared to a list of known or suspected criminals. If a sender is a known criminal, identifying transactions initiated by the individual may provide security and law enforcement personnel assistance in stopping criminal activity such as money laundering, criminal activity funding, and tax evasion. Further, some individuals may attempt to avoid detection by segmenting a single money transfer into multiple smaller transfers below the thresholds. Thus, providers may employ measures described herein to relate transactions that might otherwise appear unrelated.

In another instance, it is important to verify the identity of persons performing the transaction, particularly attendants employed by a provider or an associate. The equipment used in money transfer transactions may be subject to misuse to perform illegal transactions. For this reason, it is important to verify the identity of those using the equipment.

In an effort to avoid disclosing their identities, some individuals may attempt to use invalid IDs to establish their identities. Further, a wide variety of IDs are in common use, some of which may not be recognizable by attendants. Thus, one difficulty in the effort to establish positive identification is confirming the validity of IDs and the acceptability of a particular type of ID.

For the foregoing reasons, the present invention provides systems and methods to confirm the acceptability of ID types and the validity of IDs presented by individuals involved in money transfer transactions, both as sending parties, receiving parties, and as transaction device operators (e.g., attendants).

Attention is directed to FIG. 1, which illustrates a money transfer system 100 according to embodiments of the present invention. The system 100 includes a host computer system 102 and a network 104. The host computer system 102 may include, for example, server computers, personal computers, workstations, web servers, and/or other suitable computing devices. The host computer system 102 includes application software that programs the host computer system 102 to perform one or more functions according to the present invention. For example, application software resident on the host computer system 102 may program the host computer system 102 to process money transfer records according to embodiments of the present invention. Application software on the host computer system 102 also may program it to perform "risk scoring" of identification, as will be described in more detail below. The host computer system 102 may include one or more of the aforementioned computing devices, as well as storage devices such as databases, disk drives, optical drives, and the like. The storage devices may include solid state memory, such as RAM, ROM, PROM, and the like, magnetic memory, such as disc drives, tape storage, and the like, and/or optical memory, such as DVD. The host computer system 102 may be fully located within a single facility or distributed geographically, in which case a network may be used to integrate the host computer system 102. Many other examples are possible and apparent to those skilled in the art in light of this disclosure.

The network 104 may be the Internet, an intranet, a wide area network (WAN), a local area network (LAN), a virtual private network, any combination of the foregoing, or the like. The network 104 may include both wired and wireless connections, including optical links. In some embodiments, the network 104 is a transaction processing network. Through the network 104, transaction devices communicate with the host computer system 102.

The system 100 also includes one or more Point-of-Sale (POS) devices 106. POS devices are more fully described in U.S. patent application Ser. No. 09/634,901, filed on Aug. 8, 2000, the entire disclosure of which is incorporated herein by reference for all purposes. Essentially, POS devices are terminals for receiving transaction information and sending the information to a host computer system. For example, a POS may receive transaction information by capturing it from a card using a reader integral to or associated with the POS. A POS also may receive information from an attendant or customer via a keypad, keyboard, and/or other input device. Other examples are possible. POS devices are typically located at associate or provider locations offering money transfer services.

The system 100 also may include one or more computing devices 108 programmed to receive money transfer information from customers or attendants. Like the POS devices 106, the computing devices 108 may be located at associate locations.

The system also may include one or more Customer Service Representative (CSR) computers 110. The CSR computers 110 may be located, for example, at a call center operated by the service provider or an associate. The CSR computers 110 function much like the POS devices 106 and the computing devices 108, except that transaction information is entered by a CSR who is receiving the information from a customer by phone, for example. In some examples, a voice response unit may receive some or all of the information.

The system 100 also includes one or more receiving sites 112 from which customers may receive funds. The receive sites 112 may be associate locations equipped with a POS 106 or computing device 108. The receive sites also may be automated teller machines, kiosks (which are more fully described in U.S. patent application Ser. No. 10/225,410, filed on Aug. 20, 2002, the entire disclosure of which is incorporated herein by reference for all purposes), merchant store fronts, bank accounts, stored value accounts, and/or the like.

The system 100 also includes one or more identity verification systems 114. The identity verification systems 114 may include any of the aforementioned databases and/or computing devices. The identity verification systems 114 may be operated by government entities or private enterprises. The identity verification systems 114 may include data from a single entity, such as driver's license data from a single State Department of Motor Vehicles, or may include data from a number of different entities that issue IDs. One example of such a commercial system is provided by Aristotle International, Inc. of Washington D.C. Another example is the service provided by Acxiom of Little Rock, Ark.

According to the present invention, a customer presents himself to a money transfer location. The location may be equipped with either a POS device 106, a computing device 108, or other suitable transaction device, or may be equipped with a phone for communicating with a CSR at a remote location. The location may be operated by the provider or an associate. An attendant (or CSR) receives transaction information from the customer and verifies it according to the teachings of previously-incorporated U.S. patent application Ser. No. 10/424,558. If necessary, the attendant collects identification information from an ID of the customer. According to the present invention, the validity of the customer's ID and the acceptability of the ID type (and possible the ID of the attendant, if used to enable the device) may be confirmed by sending at least a portion of the identification information to the host computer system 102 and/or the identity verification systems 114. If the validity and acceptability of the ID is confirmed, the attendant also collects the money from the customer to complete the transaction. In some examples, the transaction is completed despite not receiving confirmation that the ID is good. This may be the case, for example, if the receiver has been identified as an individual of interest and authorities desire to attempt to apprehend the receiver rather than deny the transaction. Other examples are possible.

Confirming the validity of an ID (which, hereinafter, will be understood to include confirming the acceptability of the ID type) may include one or more of several processes, as will be described below. Briefly, if the identification information includes a number (which may include a combination of numerals, letters, and other characters), then the format of the number may be compared to known ID number formats to identify the ID type. Based on the ID type, the identification information may be transmitted to an identity verification system 114 that has information on that specific ID type. The identification information then may be compared to data in the identity verification system to determine if a match exists. In some embodiments, the identification may be "risk scored" to assess the likelihood that the ID is valid. For example, if the identification includes the customer's social security number and date of birth, the risk score may be based on the likelihood that a person of that age was issued the specific social security number. Also in some embodiments, the ID validity confirmation process may result in the creation of a suspicious activity report, which may be generated according to the teachings of previously-incorporated U.S. patent application Ser. No. 60/465,967. Other examples are possible.

Figure 2:
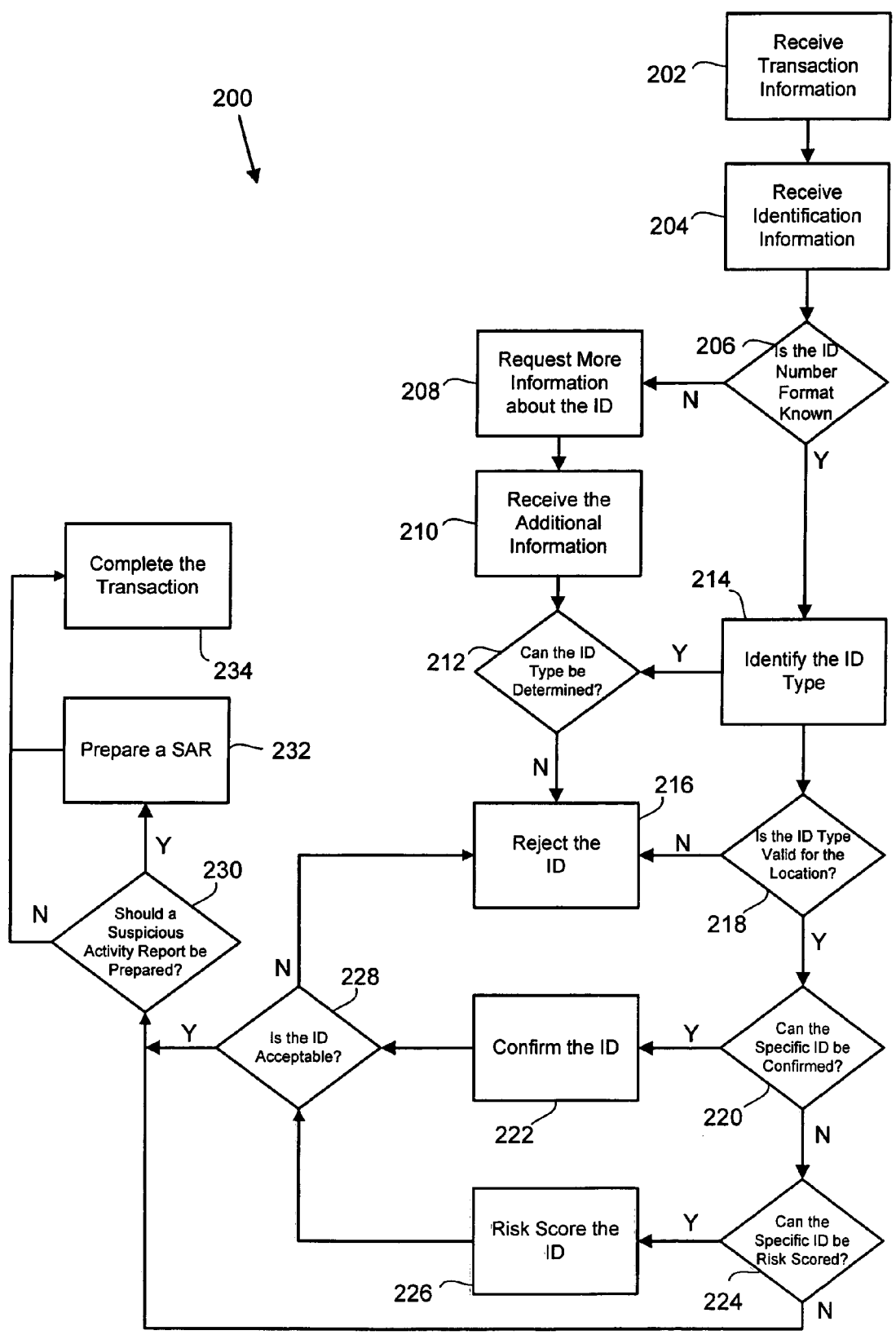
FIG. 2 illustrates a method of verifying identifications according to embodiments of the present invention.

Having described a system for confirming IDs according to the present invention, attention is directed to FIG. 2, which illustrates a method 200 of confirming the validity of IDs, according to embodiments of the present invention. The method 200 may be implemented in the system of FIG. 1 or other suitable system. It should be noted that the method 200 is exemplary only, and other embodiments may have more or fewer operations than the example of FIG. 2. Further, the operations may be carried out in a different order than that described herein. The method 200 will be described with reference to a send money transaction (i.e., a wire transfer); however, the present invention is not limited to send money transactions. The method 200 may be used for other transactions, such as money order transactions, or to confirm IDs for other reasons. Thus, the description with respect to send money transactions is not to be considered limited.

The method 200 begins at block 202 wherein an attendant receives transaction information from a customer. The transaction information may include any information necessary to complete the transaction. For example, the transaction information may include the sender's name, the recipient's name, the amount of money being sent and the like. The transaction information also may include other identifying information relating to the sender and/or the receiver. For example, the transaction information may include the sender's telephone number, occupation, and/or the like. Other examples are possible.

Also at block 202, the transaction information is entered into a transaction device, such as a POS device, computing device, or other suitable transaction device (hereinafter, collectively "transaction device"), as previously described. Some of the information may be received by "swiping" a card through a reader, or otherwise obtaining the information directly from an encoded ID.

In some embodiments, block 202 includes sending information to a host computer system and receiving a message back at the transaction device instructing the attendant to obtain more information. The need for additional information may be triggered by the transaction amount, an aggregate transaction amount, or for other reasons, as more fully described in previously-incorporated U.S. patent application Ser. No. 10/424,558. For example, if the same sender has initiated multiple send money transactions within a specific period of time having an aggregate value above a threshold, then the need for more information may be triggered. If the additional information includes an identification number, such as a driver's license number or social security number, then receiving this additional information is included in block 204.

At block 204, identification information is received from the customer. As with the transaction information, identification information may be received by swiping a card through a reader or otherwise obtaining information from an encoded ID. Identification information may be received merely by having a customer recite the ID number to the attendant (e.g., a social security number). The identification information may be a number (which may include a combination of numbers, letters, and/or other characters), a biometric feature, an image, and/or the like. The identification information is sent to a host computer system also at block 204.

At block 206, the identification information is evaluated. This may include determining if it is of a known format. For example, if the identification information includes a number having a particular number of characters with specific characters in specific locations, then the identification information may be known as a driver's license number, for example. The same concept may be applied to other types of identification information. For example, a biometric feature may be encoded in a two-dimensional bar code. The encoded information also may have a recognizable format that identifies it as, for example, a military ID. In another example, the identification information may be within a particular numerical sequence that identifies it as, for example, a passport. Many other examples are possible. For example, an ID type may be accepted based on its physical characteristics (e.g., its size, color, layout, and/or the like, the presence of a hologram, photo, and the like). Thus, at block 206, the format of the identification information is compared to known formats to determine if the ID from which the information was received is known.

Evaluating the identification information also may include merely comparing the information obtained from a swiped ID to the information actually printed on the ID. The swiped information maybe read by a magnetic reader, a one- or two-dimensional bar code reader, or the like. The swiped data may include an image of the individual to which the attendant can compare to the individual or the individual's image on the ID.

In some examples, the ID may be a "loyalty card" issued by the provider or the provider's associate. The loyalty card may include identification information that the entered into the transaction device by swiping it. The identification information may be any of the previously-described identification information such as signature, fingerprint, or the like. The loyalty card may be created at associate locations. For example, the card may be printed using magnetic ink technology. In other embodiments, the loyalty card is an account that is accessed using another of the user's commonly-used IDs, such as a driver's license. The entry of the identification information for the other ID accesses the account information.

If the identification information does not match a known ID format or matches multiple ID formats, then more information may be requested at block 208. The additional information may be used to select from among the known ID types that match the format of the identification information previously provided. For example, the attendant may be asked to enter a specific question, the answer to which is obtained from a visual inspection of the ID. The additional information also may be used to otherwise determine the type of ID from which the identification information was obtained. In some embodiments, the additional information is the ID type. For example, in response to the request for more information, the attendant may enter "Driver's License" into the transaction device or select it from a list of ID types. Many other examples are possible. In either of these cases, the additional information is received at block 210.

At block 212, a decision is made whether the ID type may be determined. If so, the ID type is determined at block 214. If not, the ID from which the ID information was obtained is rejected at block 216. The customer may then either provide another ID or abort the transaction.

Once the ID type is determined at block 214, whether as a result of the format of the identification information being know or as a result of the additional information, the validity of the ID for the location, its validity for the amount of the transaction being done, and/or its validity for the type of transaction being done is(are) determined at block 218. Because of the differences in local, regional, national, and international regulations, all ID types may not be valid in all locations. Thus, the validity of the ID for the location is determined. If the ID is not valid for the location, then the ID is rejected at block 216. If the ID type is valid for the location, then the method 200 continues at block 220.

At block 220, a determination is made whether the validity of the specific ID may be confirmed. For example, if the ID is a driver's license, it is possible that the validity of the customer's driver's license may be confirmed by consulting a driver's license database, which may be included in an identify verification system. Systems that compile information about individuals are known. Examples includes driver's license databases, credit reporting databases, and the like. In this example, the customer's driver's license number may be sent to the database along with a request to return the name associated with the driver's license number. The name may then by compared to the name provided by the customer. The same steps may be used to confirm the validity of other types of IDs having different kinds of identification information. For example, the database may respond with information indicating that the ID has expired or that it has been reported lost or stolen. The databases used to obtain the verification information may be operated by the entity that issued the ID, by an agency that compiles information for several issuing agencies, by companies that compile such information, and/or by other entities.

If the ID can be confirmed, then the process of confirming it is occurs at block 222. If the ID cannot be confirmed, then the operation may continue at block 224. At block 224, a determination is made whether the ID may be risk scored.

Risk scoring the ID may involve using multiple pieces of identification information to determine the likelihood that the ID is valid. Such information may include the ID number, the customer's birthday, the customer's place of birth, the customer's address, the entity that issued the ID, and/or the like. In a specific example, the identification information includes the customer's social security. By comparing the customer's social security number, place of birth, and age to social security number ranges issued by the social security administration to such individuals, a score may be established that reflects the likelihood that the social security number is a valid one for that customer. Many other examples are possible and apparent to those having skill in the art. Thus, at block 224, a determination is made whether the ID can be risk scored. If so, risk scoring takes place at block 226.

After the ID is confirmed and/or risk scored, a determination is made at block 228 whether the ID is acceptable based on the results. If not, the ID is rejected at block 216. If the ID is acceptable, it may be the case, nevertheless, that the risk score or information obtained in the process of confirming the ID warrants the preparation of a suspicious activity report. The decision whether to prepare a suspicious activity report is made at block 230. If one is to be prepared, it is prepared at block 232. The preparation of suspicious activity reports is more fully described in previously-incorporated U.S. patent application Ser. No. 60/465,967.

The transaction is completed at block 234, which may include: collecting money from the customer, transmitting any remaining transaction information to the host computer system, printing a receipt for the customer, notifying a recipient in the case of a send money transaction, disbursing the money to the recipient, and the like. Completing the transaction may also include queuing the transaction for further evaluation. In some cases, such transactions are eventually completed by disbursing the money to the recipient. In other cases, such transactions are ultimately completed in other ways.

It should be noted that the ID verification information may be stored locally, such as at the transaction device itself, thereby negating the need to access other databases or send information to the host computer system. This will allow transactions to be processed even if the network goes down.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to wire transfer transaction. For example, the present invention may be used to confirm the validity of IDs in other transactions, such as money order purchases, value card redemptions, other exchanges, or value, and the like. Accordingly, the above description should not be taken as limiting the scope of the invention, which is defined in the following claims.

What is claimed is:

1. A method of confirming the validity of an identification presented by an individual in a financial transaction, comprising:

receiving transaction information at a transaction device that is usable to perform the financial transaction;

based at least in part on the transaction information, determining the need for identification information;

receiving identification information at the transaction device, wherein the identification information is obtained from the identification presented by the individual and the identification information has a format;

transmitting the identification information to a host computer system;

comparing the format of the identification information to formats of known identification types;

selecting, based at least in part on the comparison, an identification type that relates to the identification information; and at the host computer system and based at least in part on the format of the identification information and identification type, assessing the validity of the identification presented by the individual from which the identification information was obtained.

2. The method of claim 1, further comprising, requesting from an identity verification system verification information relating to the identification information; and using the verification information to further assess the validity of the identification from which the identity information was obtained.

3. The method of claim 2, wherein the identity verification system comprises a selection from a group consisting of driver's license database, social security information database, image database, government identification database, identification verification company database, previously-used "valid" identification database, and credit reporting database.

4. The method of claim 1, further comprising, transmitting the transaction information to the host computer system, wherein determining the need for identification information occurs at the host computer system.

5. The method of claim 1, wherein the identification information comprises a selection from a group consisting of driver's license number, passport number, state identification number, alien identification number, government identification number, social security number, fingerprint, retinal scan, facial scan, and DNA.

6. The method of claim 1, wherein assessing the validity of the identification comprises calculating a risk score based at least in part on the identification information.

7. The method of claim 6, further comprising, based at least in part on the risk score, deciding to prepare a suspicious activity report relating to the transaction.

8. The method of claim 1, wherein the financial transaction occurs at a location and wherein assessing the validity of the identification comprises determining the validity of the identification based at least in part on the location.

9. The method of claim 1, wherein the identification relates to a customer initiating the transaction.

10. The method of claim 1, wherein the identification relates to an attendant operating the transaction device.

11. A method of confirming the validity of an identification presented by an individual in a financial transaction, comprising:

receiving identification information at a transaction device, wherein the identification information has a certain format and relates to the individual in the financial transaction, wherein the identification information is obtained from the identification, and wherein the format relates to an identification type;

transmitting the identification information to a host computer system;

at the host computer system, using the format of the identification to determine the identification type;

consulting an identification verification system relating to the identification type;

receiving verification information from the identification verification system relating to the identification information; and determining the validity of the identification based at least in part on the verification information.

12. The method of claim 11, further comprising, using the validity determination to reject the identification.

13. The method of claim 11, further comprising, using the validity determination to decide to prepare a suspicious activity report relating to the transaction.

14. A system for confirming the validity of an identification presented by an individual in a financial transaction, comprising:

a transaction device configured to receive identification information from the identification and transmit the identification information to a host computer system; and a host computer system programmed to receive the identification information, wherein the host computer system is further programmed to:

compare a format of the identification information to formats of known identification types;

based at least in part on the comparison, select an identification type that relates to the identification; and use the identification type to assess the validity of the identification.

15. The system of claim 14, wherein the identification information comprises a selection from a group consisting of driver's license number, state identification number, government identification number, alien identification number, passport number, social security number, fingerprint, retinal scan, facial scan, and DNA.

16. The system of claim 14, wherein the host computer system is further programmed to:

request verification information relating to the identification information from an identity verification system; and use the verification information to further assess the validity of the identification.

17. The system of claim 16, wherein the identity verification system comprises a selection from a group consisting of driver's license database, social security information database, credit reporting database.

18. The system of claim 14, wherein the host computer system is further programmed to calculate a risk score based at least in part on the identification information.

19. The system of claim 18, wherein the host computer system is further programmed to determine whether to prepare a suspicious activity report relating to the transaction, based at least in part on the risk score.

20. The system of claim 14, wherein the identification relates to an attendant operating the transaction device.

\* \* \* \* \*